(12) United States Patent
Jiang (10) Patent No.: US 8,441,580 B2
(45) Date of Patent: May 14, 2013

(54) METHOD AND SYSTEM FOR SCANNING A FREQUENCY CHANNEL IN DIGITAL TELEVISION

(75) Inventor: Jeng-Shiann Jiang, Tainan County (TW)

(73) Assignee: Himax Technologies Limited, Tainan (TW)

( * ) Notice: Subject to any disclaimer, the term of this patent is extended or adjusted under 35 U.S.C. 154(b) by 1360 days.

(21) Appl. No.: 11/862,214

(22) Filed: Sep. 27, 2007

(65) Prior Publication Data

US 2009/0086108 A1   Apr. 2, 2009

(51) Int. Cl.
*H04N 5/50* (2006.01)

(52) U.S. Cl.
USPC .................. 348/731; 348/735; 375/321

(58) Field of Classification Search .......... 348/725, 348/735, 726, 21, 731, 732; 375/321, 326, 375/323, 345; 455/192
See application file for complete search history.

(56) References Cited

U.S. PATENT DOCUMENTS

| | | | | | |
|---|---|---|---|---|---|
| 4,920,416 | A | * | 4/1990 | Motoyama | 348/738 |
| 5,388,149 | A | * | 2/1995 | Lynn et al. | 455/561 |
| 5,867,539 | A | * | 2/1999 | Koslov | 375/346 |
| 5,877,698 | A | * | 3/1999 | Kusnier et al. | 340/5.92 |
| 5,940,450 | A | * | 8/1999 | Koslov et al. | 375/344 |
| 6,038,433 | A | | 3/2000 | Vegt | |
| 6,115,080 | A | * | 9/2000 | Reitmeier | 348/731 |
| 6,192,088 | B1 | * | 2/2001 | Aman et al. | 375/326 |
| 7,133,082 | B2 | * | 11/2006 | Limberg | 348/725 |
| 7,187,913 | B1 | * | 3/2007 | Rahn et al. | 455/188.1 |
| 7,406,119 | B2 | * | 7/2008 | Yamano et al. | 375/222 |
| 7,447,252 | B2 | * | 11/2008 | Partyka | 375/133 |
| 7,853,971 | B2 | * | 12/2010 | Hayashi | 725/31 |
| 2006/0038926 | A1 | | 2/2006 | Mayer et al. | |

FOREIGN PATENT DOCUMENTS

| | | |
|---|---|---|
| CN | 1181681 | 5/1998 |
| CN | 1780368 | 5/2006 |
| CN | 1913373 | 2/2007 |

OTHER PUBLICATIONS

Office Action of Taiwan Application 097108821, Sep. 26, 2011.

* cited by examiner

*Primary Examiner* — Annan Shang
(74) *Attorney, Agent, or Firm* — Su IP Consulting (57) ABSTRACT

One embodiment sets forth a method of scanning a frequency channel, which includes receiving a radio-frequency signal in a selected frequency channel, performing a carrier recovery process, and evaluating a control signal generated during the carrier recovery process to determine the presence of program content in the selected frequency channel.

20 Claims, 12 Drawing Sheets

METHOD AND SYSTEM FOR SCANNING A FREQUENCY CHANNEL IN DIGITAL TELEVISION

BACKGROUND OF THE INVENTION

1. Field of the Invention

The present invention generally relates to digital television technologies, and more particularly to a method and system for scanning a frequency channel in digital television.

2. Description of the Related Art

Unless otherwise indicated herein, the approaches described in this section are not prior art to the claims in this application and are not admitted to be prior art by inclusion in this section.

The technical advances have enabled the transmission of digital television ("DTV") signals in the same bandwidth currently used by the analog National Television System Committee ("NTSC") television system. DTV transmission employs digital modulation techniques, such as the eight-level vestigial sideband ("VSB") modulation scheme developed by the Advanced Television Standards Committee ("ATSC") in the United States, which utilize scarce bandwidth in a more spectrally efficient manner to transport and present audio and video signals. As a result, digital television allows more channels containing more information to be broadcasted within an equivalent bandwidth utilized by the current analog television system. To facilitate the reception of these numerous channels, certain DTV receivers are equipped with a channel auto-scanning function that automatically scans each channel to detect the presence of program content when such DTV receivers are turned on for the first time.

Figure 1:
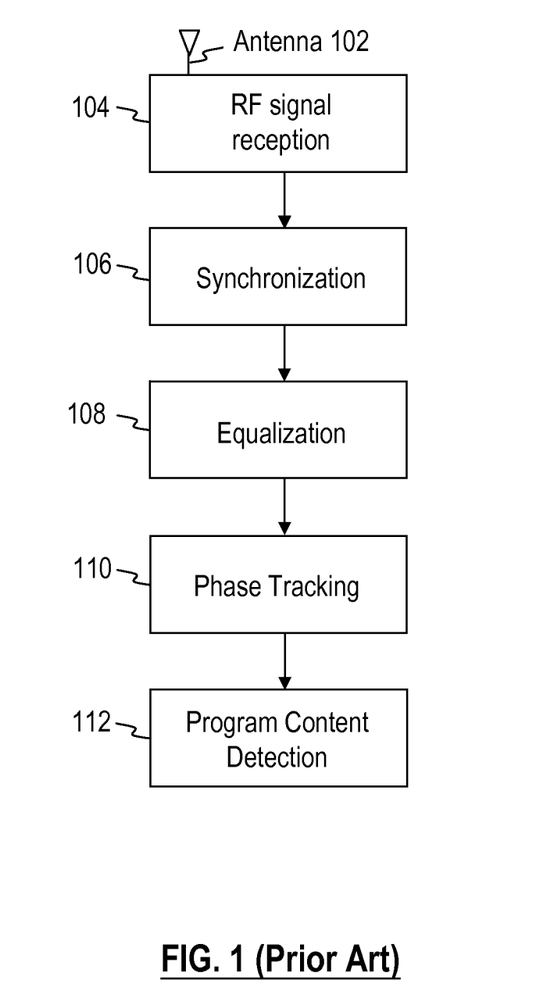
FIG. 1 is a simplified conceptual diagram illustrating how a conventional DTV receiver performs the channel auto-scanning function.

To illustrate, FIG. 1 is a simplified conceptual diagram showing how a conventional DTV receiver performs the channel auto-scanning function. Once the DTV receiver is turned on, a transmitted radio-frequency ("RF") signal received via an antenna 102 is first tuned to a selected frequency channel and processed in a RF signal reception stage 104, through which the RF signal is converted to an intermediate frequency ("IF") signal. The IF signal is then put through a synchronization stage 106 in which the carrier wave of the RF signal is recovered using a pilot tone embedded in the transmitted RF signal. Based on the recovered carrier wave, a baseband signal is demodulated and processed through an equalization stage 108 to remove any linear distortions, such as spectrum tilt and multi-path echo. The baseband signal is then processed in a phase tracking stage 110 that removes any remaining phase noise. After the output of the phase tracking stage 110, data packets that contain program identification codes are restored, which are used to detect the presence of program content in the selected frequency channel in a program content detection stage 112. The same procedure described above is repeated to operate on a next frequency channel in an attempt to detect the presence of program content.

While the aforementioned approach can detect the presence of program content, the amount of time required to complete the scanning procedure from the RF reception stage 104 through the program content detection stage 112 for all the different frequency channels is long. As the number of channels, especially for DTV, continues to grow (e.g., in excess of hundreds), the amount of time required to accomplish the channel auto-scanning function is also becoming unacceptably long.

What is needed in the art is thus a method and system that can cost effectively and efficiently scan a frequency channel to detect the presence of program content and address at least the problems set forth above.

SUMMARY OF THE INVENTION

The present application describes a method and system for scanning a frequency channel in digital television. Specifically, one embodiment of the present invention sets forth a method of scanning a frequency channel, which includes receiving a radio-frequency signal in a selected frequency channel, performing a carrier recovery process, and evaluating a control signal generated during the carrier recovery process to determine the presence of program content in the selected frequency channel.

Another embodiment of the present invention provides a digital television receiver, which includes a tuner operable to receive a radio-frequency signal in a selected frequency channel, a demodulator including a signal processing unit operable to recover a carrier wave of the radio-frequency signal, and a program detector configured to determine the presence of program content in the selected frequency channel based on a control signal generated as the signal processing unit operates to recover the carrier wave.

At least one advantage of the present invention disclosed herein is the ability to determine whether program content is present in a frequency channel during the carrier recovery stage without having to perform the equalization stage. As a result, the channel scanning process can be accomplished in an efficient and cost effective manner.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 2A:
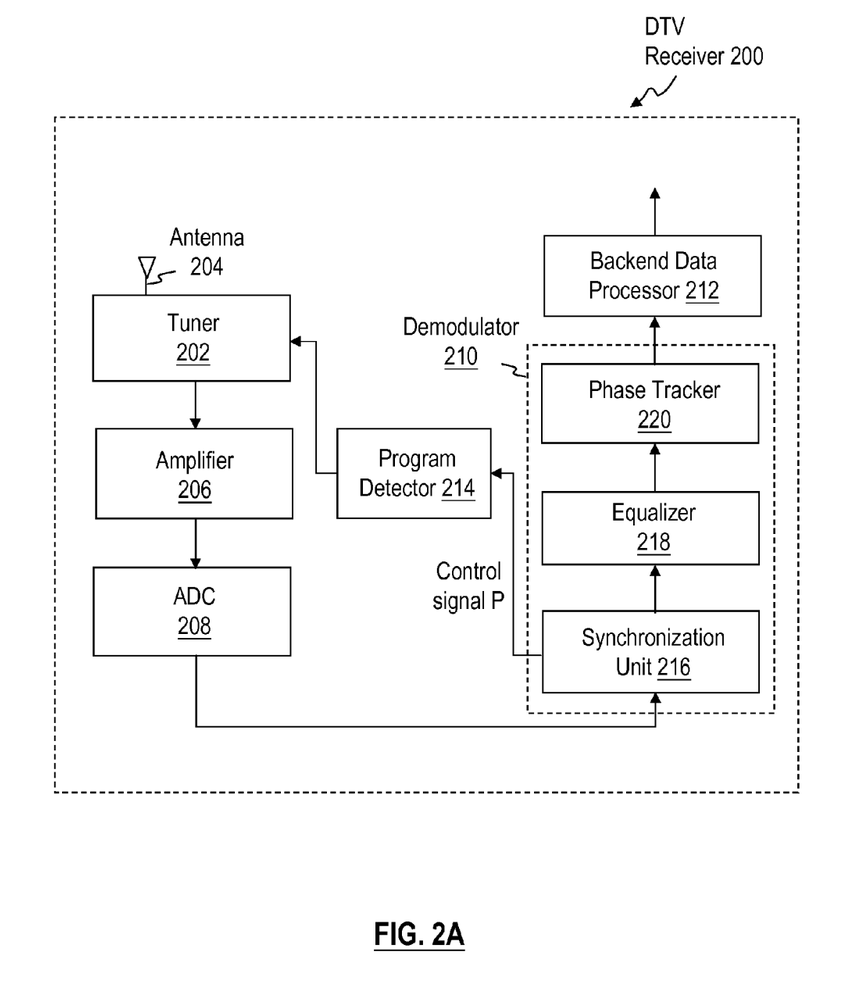
FIG. 2A is a simplified block diagram of a DTV receiver that implements one or more aspects of the present invention.

FIG. 2A is a simplified block diagram of a DTV receiver 200, according to one embodiment of the present invention. The DTV receiver 200 includes a tuner 202 connected to an antenna 204, an amplifier 206, an analog-to-digital ("ADC") converter 208, a demodulator 210, a backend data processor 212, and a program detector 214. The tuner 202 receives a RF signal in a selected frequency channel from the antenna 204, converts the RF signal to an IF signal, and filters the IF signal to remove undesirable noise signals. After having been amplified via the amplifier 206, the IF signal is digitized via the ADC 208 and is then processed through the demodulator 210 to restore data packets. Operations performed within the demodulator 210 include recovering the carrier wave and synchronization signals via a synchronization unit 216, removing linear distortions that may have occurred during the signal transmission via an equalizer 218, and tracking and eliminating unwanted noise via a phase tracker 220. The backend data processor 212 then proceeds to decode the data content contained in the data packets, applies error corrections, and de-randomizing the data to restore the information content that then may be transmitted for presentation on a display panel (not shown). The program detector 214 is coupled to the synchronization unit 216 of the demodulator 210 and also the tuner 202 and is configured to scan a frequency channel to detect the presence of program content based on a control signal P provided by the synchronization unit 216.

Figure 2B:
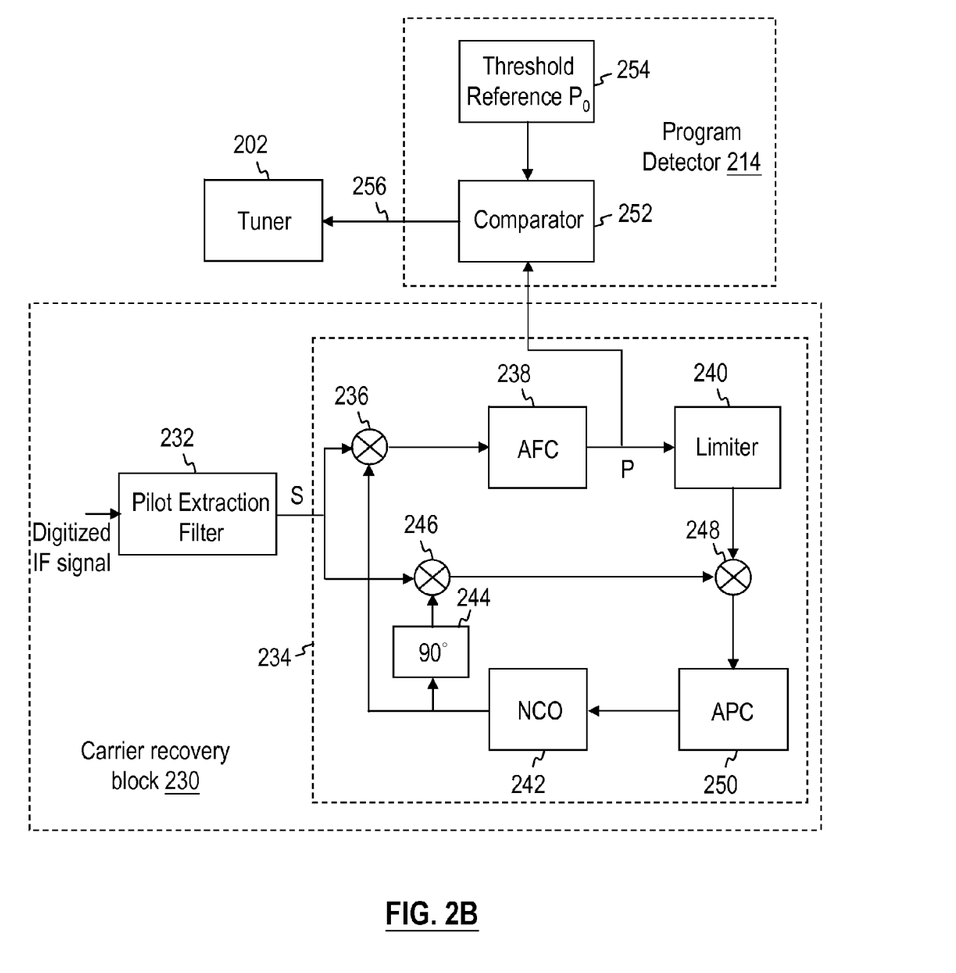
FIG. 2B is a conceptual diagram illustrating the mechanism implemented in a synchronization stage to detect the presence of program content in a frequency channel according to an embodiment of the invention.

FIG. 2B is a conceptual diagram illustrating the mechanism implemented in a synchronization stage to detect the presence of program content in a frequency channel according to an embodiment of the invention. In conjunction with FIG. 2A, the program detector 214 is coupled to a carrier recovery block 230 that is provided in the synchronization unit 216 to process the digitized IF signal from the output of the ADC 208 for recovering the carrier wave of the RF signal received by the tuner 202. More specifically, the carrier recovery block 230 includes a pilot extraction filter 232 and a digital frequency-and-phase-locked loop ("DFPLL") block 234. The pilot extraction filter 232 is configured to process the digitized IF signal and output a signal S that is supposed to include the pilot tone. The DFPLL block 234, which includes a frequency-locked loop portion combined with a phase-locked loop portion, is configured to recover the carrier wave of the transmitted RF signal based on the signal S. More specifically, the frequency-locked loop portion includes a mixer 236, an automatic frequency control ("AFC") low pass filter 238 and a limiter 240, which are adapted to lock the frequency of an output signal from a numerically controlled oscillator ("NCO") 242 to the frequency of the carrier wave. The phase-locked loop portion includes a 90-degrees phase shifter 244, mixers 246 and 248, and an automatic phase control ("APC") low pass filter 250, which are adapted to lock the phase of the output signal of the NCO 242 to the phase of the carrier wave.

Figure 2C:
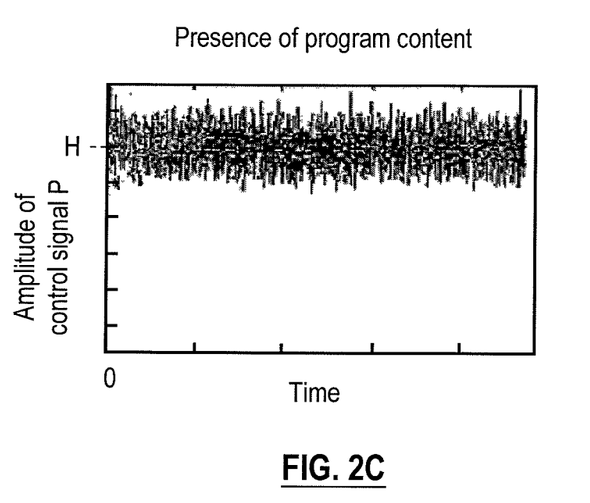
FIG. 2C is a graph illustrating the use of a control signal P generated during a carrier recovery stage to detect the presence of program content according to one or more aspects of the present invention.
Figure 2D:
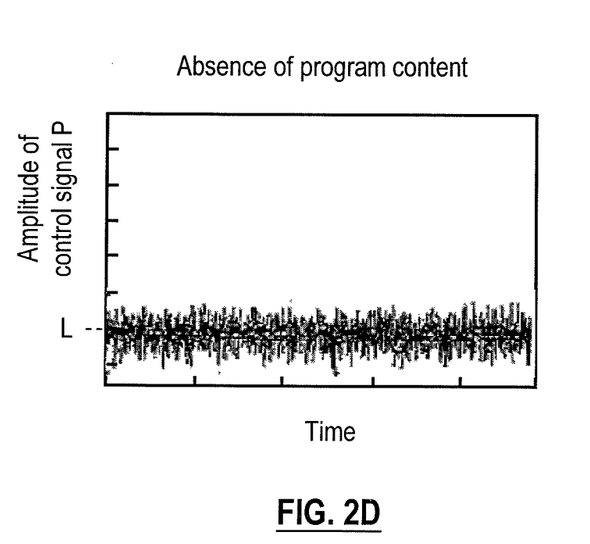
FIG. 2D is a graph illustrating the use of a control signal P generated during a carrier recovery stage to detect the absence of program content according to one or more aspects of the present invention.

To determine whether the scanned frequency channel contains program content, the output of the AFC low pass filter 238, also referred to as a control signal P, is analyzed in the program detector 214 to determine whether any program content is present. More specifically, in conjunction with the graphs shown in FIGS. 2C and 2D, the amplitude of the control signal P is at a different level depending on the result of the carrier recovery stage performed by the DFPLL block 234. If the carrier recovery stage succeeds, then the amplitude of the control signal P fluctuates around a high average level H that is proportional to the amplitude of a detected pilot tone signal. With this high amplitude level H, indicating the detection of the pilot tone signal, the frequency channel is deemed to contain program content. On the other hand, if the carrier recovery stage fails, then the amplitude of the control signal P fluctuates around a low average level L indicating that no pilot tone signal is present. Under this scenario, the frequency channel is deemed not to contain any program content. Thus, to evaluate the presence of program content, the control signal P is compared against a threshold reference set between the low level L and the high level H. If the amplitude of the control signal P exceeds the threshold reference, then program content is deemed to be present on the scanned channel. Otherwise, the scanned channel is deemed not to convey any program content.

Referring again to FIG. 2B, to evaluate the control signal P, one implementation of the program detector 214 includes a comparator 252 that compares the amplitude of the control signal P against a threshold reference $P_0$ stored in a register 254. If the amplitude of the control signal P is greater than the threshold reference $P_0$, then a signal indicative of detecting the presence of program content in the scanned channel is generated. On the other hand, if the amplitude of the control signal P is less than the threshold reference $P_0$, then the scanned channel is deemed not to contain any program content. The program detector 214 notifies the tuner 202 of the comparison result via a serial control bus 256 to switch to another frequency channel to scan. The same steps as described above to detect program content can resume scanning the following frequency channel.

Figure 2E:
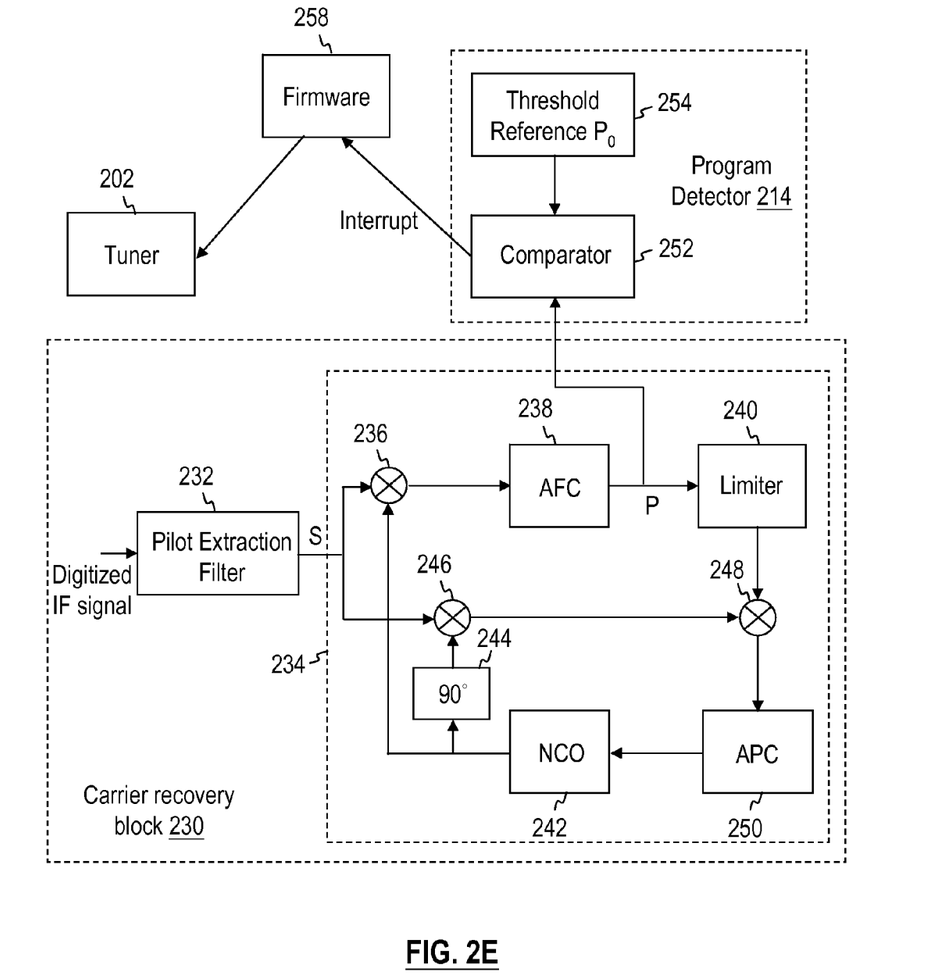
FIG. 2E is a conceptual diagram illustrating the interaction between a program detector and a tuner according to another embodiment of the present invention.

It should be noted that the communication between the program detector 214 and the tuner 202 may be accomplished via various links. FIG. 2E is a conceptual diagram of another embodiment in which the program detector 214 is linked with the tuner 202 via firmware 258. Like the embodiment shown in FIG. 2B, the program detector 214 receives a control signal P from the carrier recovery block 230. However, once the presence of program content is detected, the program detector 214 issues an interrupt signal to notify the firmware 258. The firmware 258 then causes the tuner 202 to be configured to switch to another frequency channel to scan.

As has been described above, the program detector 214 thus is able to determine the presence or absence of program content in a frequency channel by evaluating a control signal P generated in the carrier recovery stage against a threshold reference. To ensure that the result of the evaluation is correct, further verification steps may be additionally implemented after the control signal P is compared against the threshold reference.

Figure 3:
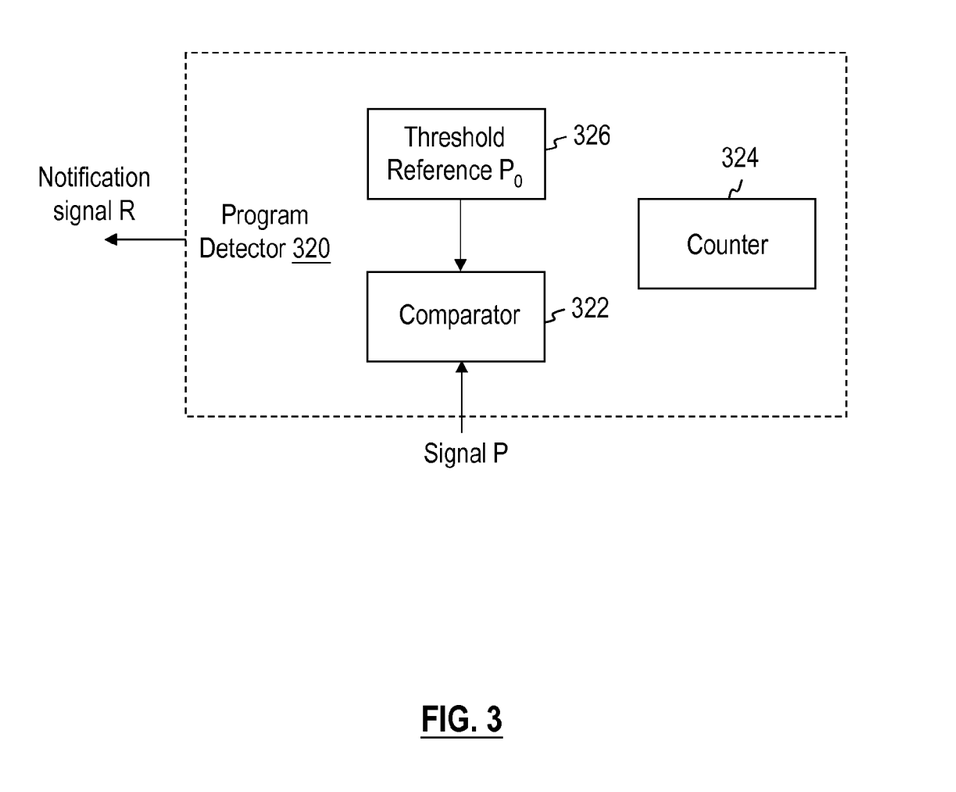
FIG. 3 is a conceptual diagram of a program detector configured to verify the detected absence of program content in a frequency channel, according to an embodiment of the present invention.

FIG. 3 is a conceptual diagram of a program detector 320 configured to verify the detected absence of program content in a frequency channel, according to an embodiment of the present invention. Similar to the embodiments described above, the program detector 320 includes a comparator 322 configured to compare the control signal P derived in the carrier recovery stage against the threshold reference $P_0$ stored in a register 326. However, when the amplitude of the control signal P is less than the threshold reference $P_0$, the program detector 320 issues a notification signal R to trigger a repeated carrier recovery process in order to retest the control signal P and confirm the detected absence of program content. The number of times the control signal P is retested is controlled by a counter 324, which decrements each time the comparison between the control signal P and the threshold reference $P_0$ occurs. After the counter 324 reaches 0, if the amplitude of the control signal P is consistently less than the threshold reference $P_0$ in each of the comparison iterations, then this further confirms that the scanned frequency channel does not contain any program content.

Figure 4A:
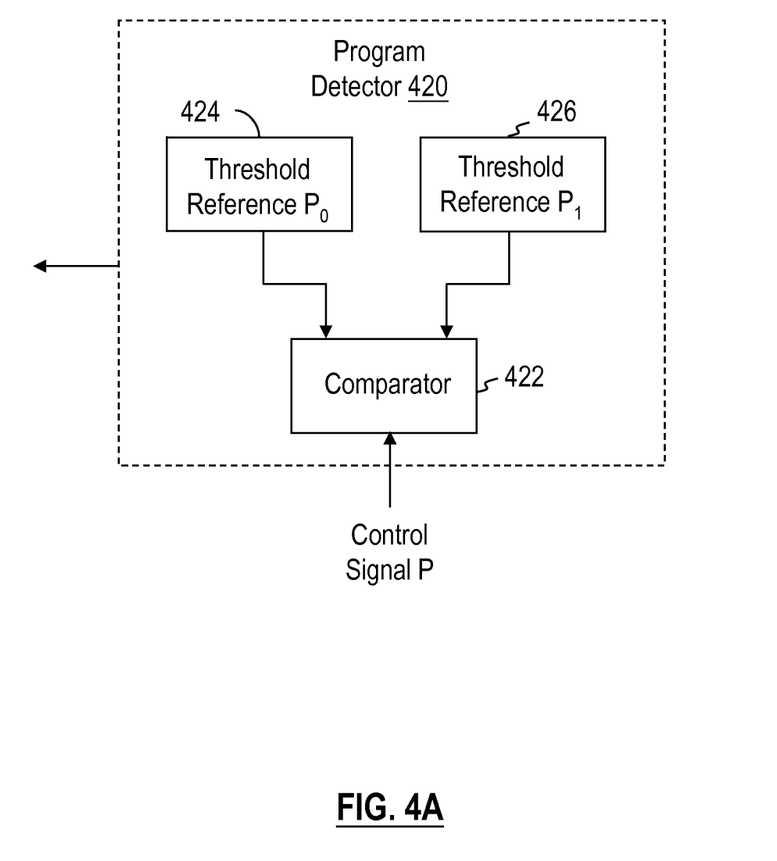
FIG. 4A is a conceptual diagram of a program detector 420 configured to verify the detected presence of program content in a frequency channel, according to an embodiment of the present invention.
Figure 4B:
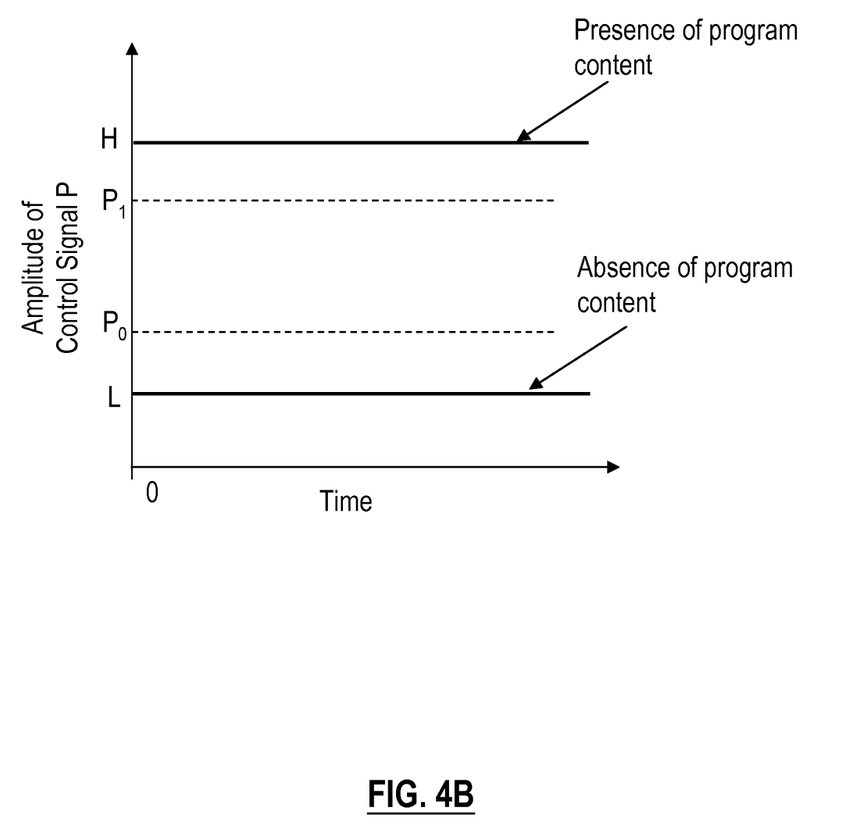
FIG. 4B is a graph illustrating how the signal P is evaluated by the program detector shown in FIG. 4A to verify the presence of program content, according to an embodiment of the present invention.

FIG. 4A is a conceptual diagram of a program detector 420 configured to verify the detected presence of program content in a frequency channel, according to an embodiment of the present invention. Similar to the embodiments described above, to detect the presence of program content, the program detector 420 includes a comparator 422 that evaluates the control signal P derived in the carrier recovery stage against the threshold reference $P_0$ stored in a register 424. However, when the amplitude of the control signal P is greater than the threshold reference $P_0$, the comparator 422 further evaluates the amplitude of the control signal P against another threshold reference $P_1$, which is greater than $P_0$ and stored in a register 426. As shown in the graph of FIG. 4B, the first threshold reference $P_0$ and second threshold reference $P_1$ fall within the range between the low level L, corresponding to failed carrier recovery and absence of program content, and the high level H corresponding to successful carrier recovery and presence of program content. When the amplitude of the control signal P is greater than the first threshold reference $P_0$, the comparator 422 further compares the control signal P against the second threshold reference $P_1$. In this implementation, if the amplitude of the control signal P is greater than the second threshold reference $P_1$, then the presence of program content is deemed to be detected. If the amplitude of the control signal P instead falls within the range between the threshold references $P_0$ and $P_1$, then additional demodulation steps, such as completing the synchronization step and performing the equalization step, are performed to restore data packets. The detected presence of program content may be confirmed by inspecting program identification codes in the restored data packets.

In conjunction with FIGS. 2A-2E, FIG. 5A is a flowchart illustrating method steps for scanning a frequency channel according to an embodiment of the present invention. In initial step 502, the tuner 202 of FIG. 2A receives a RF signal in a selected frequency channel, and converts the RF signal to an IF signal. After the IF signal is digitized, the IF signal is then processed in step 504 through the carrier recovery block 230 of FIG. 2B to recover a carrier wave. As the carrier recovery process proceeds, a control signal P is generated in step 506 at the output of the AFC low pass filter 238 in the carrier recovery block 230. In step 508, after performing the carrier recovery process over a period of time, the program detector 214 evaluates the control signal P to determine whether program content is present in this selected frequency channel. After the program detector 214 completes its evaluation, the program detector 214 notifies the tuner 202 to switch to a next frequency channel to scan in step 510. The method steps 502-508 are then repeated to determine whether program content is present in the next frequency channel.

Figure 5A:
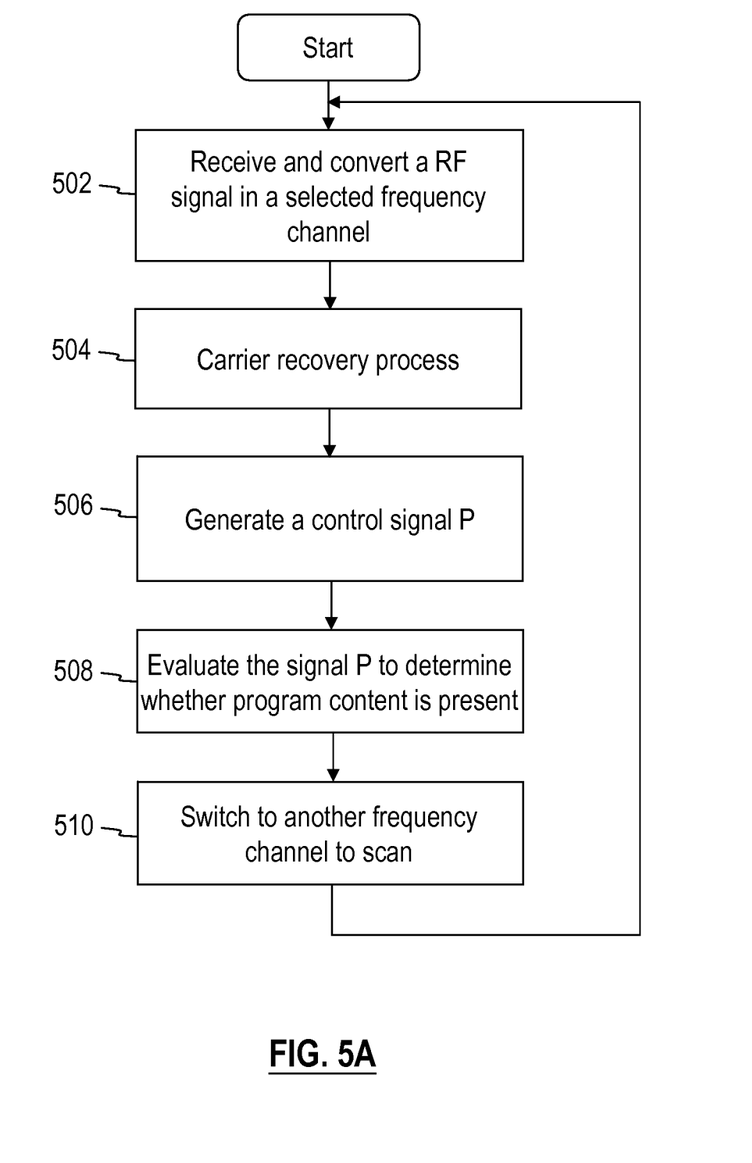
FIG. 5A is a flowchart illustrating method steps for scanning a frequency channel according to an embodiment of the present invention.
Figure 5B:
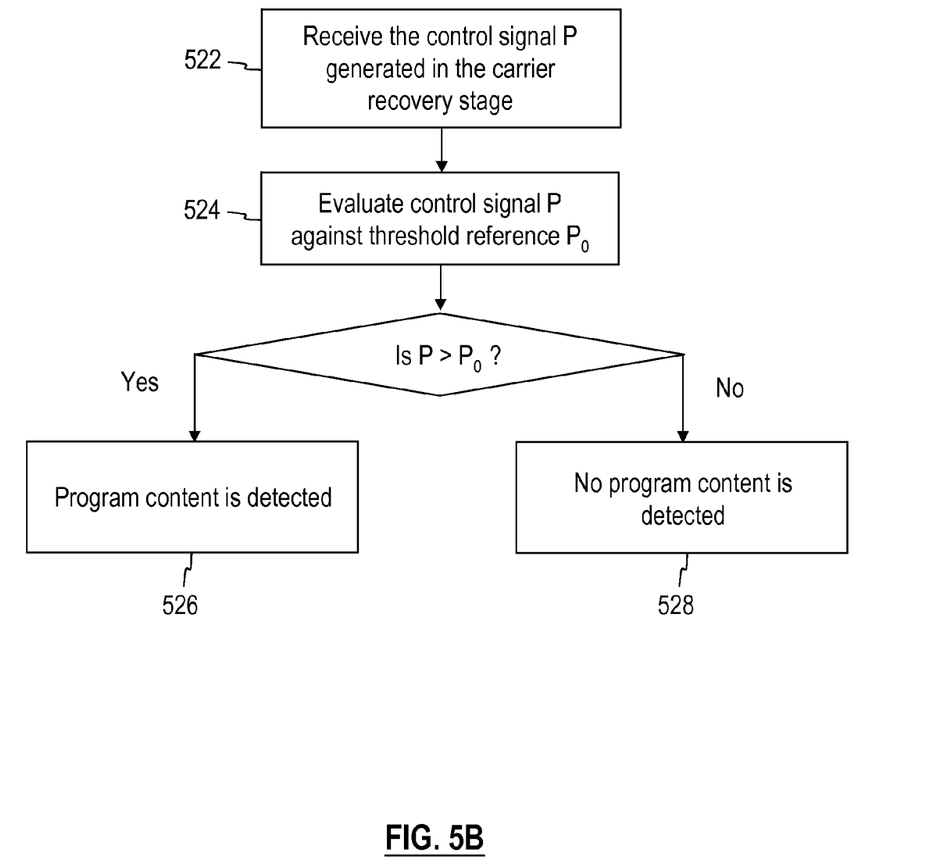
FIG. 5B is a flowchart illustrating method steps implemented by a program detector to determine whether program content is present in a specific frequency channel according to an embodiment of the present invention.

In conjunction with FIG. 2B, FIG. 5B is a flowchart illustrating method steps implemented by the program detector 214 to determine whether program content is present in a specific frequency channel according to an embodiment of the present invention. In step 522, the program detector 214 receives the control signal P generated by the carrier recovery block 230. In step 524, the comparator 252 then compares the amplitude of the control signal P against the threshold reference $P_0$. When the amplitude of the control signal P is greater than the threshold reference $P_0$, program content is deemed to be detected in the scanned frequency channel in step 526. On the other hand, when the amplitude of the control signal P is less than the threshold reference $P_0$, no program content is detected in step 528.

Figure 5C:
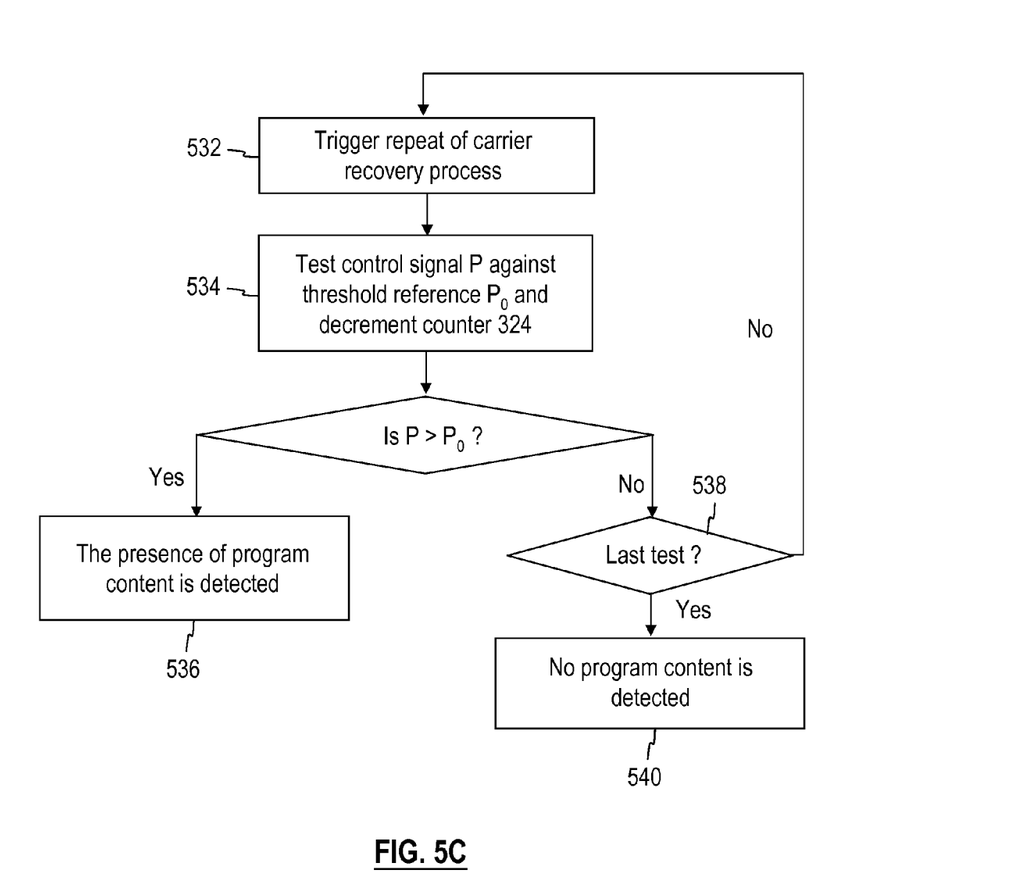
FIG. 5C is a flowchart illustrating a process of verifying a detection result of no program content on a selected frequency channel, according to an embodiment of the present invention.

In conjunction with FIG. 5B and FIG. 3, FIG. 5C is a flowchart illustrating a process of verifying the detection result provided in step 528 of FIG. 5B, according to an embodiment of the present invention. More specifically, after the program detector 320 of FIG. 3 makes an initial determination that there is no program content in a selected frequency channel, in step 532, the program detector 320 issues a notification signal R to trigger a repeated carrier recovery process. In step 534, the comparator 322 tests again the derived control signal P against the threshold reference $P_0$, and the counter 324 in the program detector 320 is also decremented by 1. If the amplitude of the control signal P is greater than the threshold reference $P_0$, the presence of program content in the frequency channel is deemed to be detected in step 536. Otherwise, in one implementation, if the counter 324 is not yet equal to 0 in step 538, then another control signal P is derived from the carrier recovery process and tested again in step 534. If the counter 324 is equal to 0, then the program detector 320 establishes that no program content is present in the frequency channel in step 540.

Figure 5D:
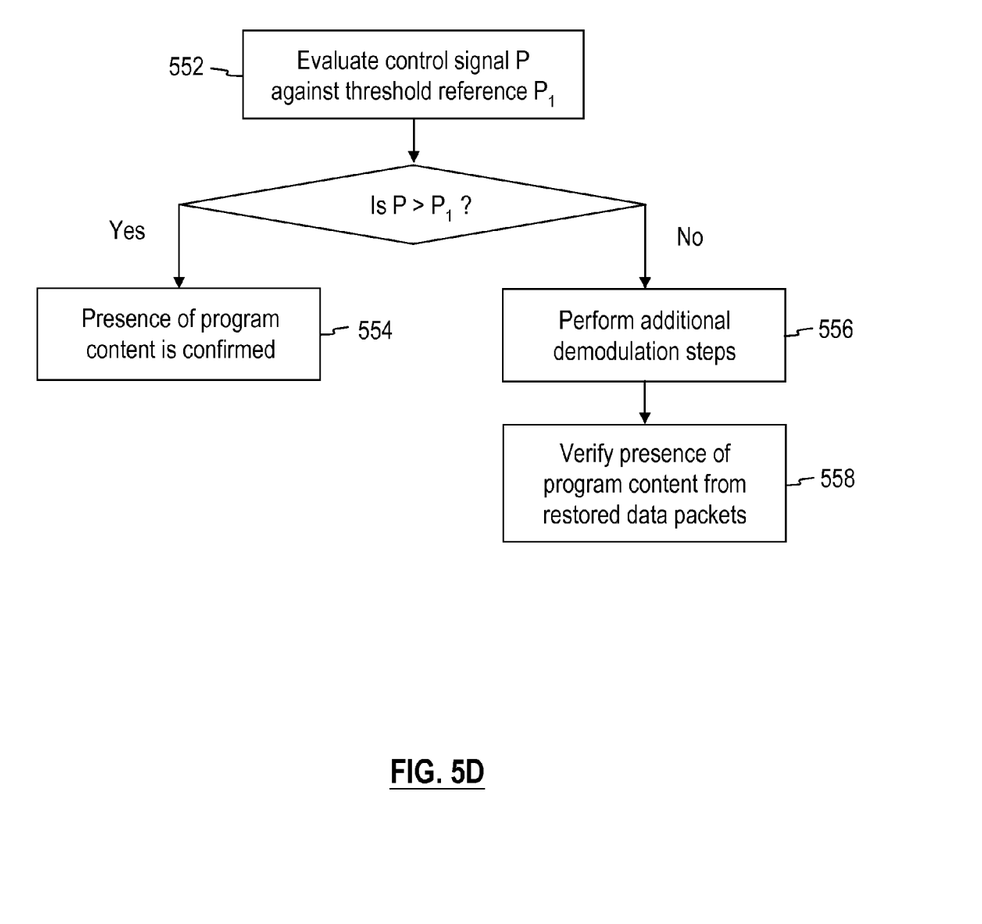
FIG. 5D is a flowchart illustrating a process of verifying a detection result of having program content present on a selected frequency channel, according to an embodiment of the present invention.

In conjunction with FIG. 5B and FIG. 4A, FIG. 5D is a flowchart illustrating a process of verifying the detection result provided in step 526 of FIG. 5B, according to an embodiment of the invention. Similar to the discussions above, after the program detector 420 of FIG. 4A makes an initial determination that program content is present on a selected frequency channel, in step 552, the comparator 422 further tests the amplitude of the control signal P against the threshold reference $P_1$. If the amplitude of the control signal P is greater than the threshold reference $P_1$, then the program detector 420 confirms the presence of program content in step 554. Otherwise, additional demodulation steps are performed in step 556 to restore data packets. In step 558, the presence of program content then may be verified by looking for program identification codes in the restored data packets.

As has been described above, the systems and methods described herein are thus able to detect the presence or absence of program content in a frequency channel early in the carrier recovery stage. As a result, the channel scanning process can be accomplished in a cost effective and fast manner.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

I claim:

1. A method of scanning a frequency channel, the method comprises:
   receiving, by a receiver, a radio-frequency signal in a selected frequency channel;
   performing, by the receiver, a carrier recovery process associated with the radio-frequency signal;
   generating, by the receiver, a control signal during the carrier recovery process;
   processing, by the receiver, a baseband signal extracted from the radio-frequency signal; and
   prior to completing the processing of the baseband signal, evaluating, by the receiver, the control signal to determine the presence of program content in the selected frequency channel.

2. The method of claim 1, wherein the performing of the carrier recovery process includes:
   extracting an output signal having a pilot tone associated with the radio-frequency signal; and
   recovering a carrier wave of the radio-frequency signal through a frequency and phase locked loop based on the output signal.

3. The method of claim 2, wherein the control signal is generated at an output of an automatic frequency control low pass filter in the frequency and phase locked loop.

4. The method of claim 1, wherein the evaluating of the control signal includes comparing the control signal against a first threshold reference.

5. The method of claim 4, wherein the presence of program content in the selected frequency channel is detected when the amplitude of the control signal is greater than the first threshold reference.

6. The method of claim 4, wherein the absence of program content is detected when the amplitude of the control signal is less than the first threshold reference.

7. The method of claim 4, wherein the evaluating of the control signal further includes comparing the amplitude of the control signal against a second threshold reference that is greater than the first reference, if the amplitude of the control signal is greater than the first threshold reference.

8. The method of claim 7, further comprising:
   demodulating the radio-frequency signal to restore data packets when the amplitude of the control signal is between the first and second threshold references; and
   verifying the presence of program content based on the content of the data packets.

9. The method of claim 4, further comprising:
   repeating the carrier recovery process to reevaluate the amplitude of the control signal against the first threshold reference, if the amplitude of the control signal is less than the first threshold reference.

10. The method of claim 1, further comprising sending a notification signal via a serial control bus or firmware to trigger a switch to a next frequency channel to scan.

11. A digital television receiver, comprising:
    a tuner operable to receive a radio-frequency signal in a selected frequency channel;
    a demodulator operable to recover a carrier wave of the received radio-frequency signal, process a baseband signal extracted from the radio-frequency signal, and generate a control signal; and
    prior to the demodulator completes processing the baseband signal, a program detector configured to determine the presence of program content in the selected frequency channel based on the control signal.

12. The digital television receiver of claim 11, wherein the demodulator includes a frequency and phase locked loop configured to recover the carrier wave.

13. The digital television receiver of claim 12, wherein the control signal is generated at an output of an automatic frequency control low pass filter in the frequency and phase locked loop.

14. The digital television receiver of claim 11, wherein the program detector is configured to compare the amplitude of the control signal against a first threshold reference.

15. The digital television receiver of claim 14, wherein the presence of program content in the selected frequency channel is detected when the amplitude of the control signal is greater than the first threshold reference.

16. The digital television receiver of claim 14, wherein the absence of program content is detected when the amplitude of the control signal is less than the first threshold reference.

17. The digital television receiver of claim 14, wherein the program detector is configured to further compare the amplitude of the control signal against a second threshold reference that is greater than the first threshold reference, if the amplitude of the control signal is greater than the first threshold reference.

18. The digital television receiver of claim 17, wherein the demodulator is configured to restore data packets and inspect the content of the data packets to verify the presence of program content, if the amplitude of the control signal is between the first and second threshold references.

19. The digital television receiver of claim 14, wherein the program detector is configured to reevaluate the control signal for the selected frequency channel, if the amplitude of the control signal is less than the first threshold reference.

20. The digital television receiver of claim 11, wherein the program detector is configured to communicate with the tuner via either a serial control bus or firmware.

* * * * *